(12) United States Patent
Zerbini et al.

(10) Patent No.: US 7,252,002 B2
(45) Date of Patent: Aug. 7, 2007

(54) PLANAR INERTIAL SENSOR, IN PARTICULAR FOR PORTABLE DEVICES HAVING A STAND-BY FUNCTION

(75) Inventors: Sarah Zerbini, Cornaredo (IT); Angelo Merassi, Vigevano (IT); Ernesto Lasalandra, S. Donato Milanese (IT); Benedetto Vigna, Pietrapertosa (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 10/948,095

(22) Filed: Sep. 23, 2004

(65) Prior Publication Data

US 2005/0274184 A1 Dec. 15, 2005

(30) Foreign Application Priority Data

Sep. 26, 2003 (EP) .................................. 03425623

(51) Int. Cl.
*G01P 15/125* (2006.01)
(52) U.S. Cl. .................................................. 73/514.32
(58) Field of Classification Search ............. 73/514.32; 361/278
See application file for complete search history.

(56) References Cited

U.S. PATENT DOCUMENTS

| | | | |
|---|---|---|---|
| 5,025,346 A | 6/1991 | Tang et al. | 361/283 |
| 5,528,937 A * | 6/1996 | Dufour | 73/514.32 |
| 5,864,064 A | 1/1999 | Kano et al. | 73/514.36 |
| 5,955,668 A * | 9/1999 | Hsu et al. | 73/504.12 |

FOREIGN PATENT DOCUMENTS

| | | |
|---|---|---|
| EP | 0 833 537 A2 | 4/1998 |
| JP | 2000-304766 | 11/2000 |

* cited by examiner

*Primary Examiner*—John E. Chapman
(74) *Attorney, Agent, or Firm*—Lisa K. Jorgenson; Harold H. Bennett, II; Seed IP Law Group PLLC

(57) ABSTRACT

A planar inertial sensor includes a first region and a second region of semiconductor material. The second region is capacitively coupled, and mobile with respect to the first region. The second region extends in a plane and has second portions, which face respective first portions of the first region. Movement of the second region, relative to the first region, in any direction belonging to the plane modifies the distance between the second portions and the first portions, which in turn modifies a value of the capacitive coupling.

31 Claims, 3 Drawing Sheets

PLANAR INERTIAL SENSOR, IN PARTICULAR FOR PORTABLE DEVICES HAVING A STAND-BY FUNCTION

BACKGROUND OF THE INVENTION

1. Field of the Invention

The present invention relates to a planar inertial sensor, in particular for portable devices having a stand-by function, of micro-electro-mechanical-system (MEMS) type.

In particular, the subject matter of the present invention is an inertial sensor for detecting movement that is able to generate a capacitive variation signal, as a function of an input acceleration having any direction parallel to the plane of the sensor.

2. Description of the Related Art

Inertial devices for detecting movement are known and are able to detect acceleration in one or more directions. They generally comprise a moving element and a fixed body, the moving element being able to move with respect to the fixed body in response to an acceleration. The movement of the moving element brings about the variation of an electrical signal, which can be used by an appropriate control circuit.

Most known devices for detection of movement are currently formed by objects of large dimensions.

For example, inertial devices are known consisting of a glass bulb filled with mercury or other conductive liquids and accommodating a plurality of electrodes that enable detection of an electrical conductivity variation in the case of contact between the electrodes and the liquid following upon a displacement of the device.

Also known (see for example the U.S. Pat. No. 4,337,402) are switches for detecting movement, formed by a non-conductive cylindrical body accommodating a plurality of electrical contacts forming parallel tracks arranged along the circumference thereof, and a conductive bail, suspended in proximity of the electrical contacts via two conductive springs. When moving in a horizontal or vertical direction, the ball comes into contact with the conductive tracks, generating an activation signal.

More recently, the use of MEMS technology has been proposed for inertial movement-detection sensors. These sensors comprise a mobile part and a fixed part, both of conductive material (silicon and/or metal), capacitively coupled to one another. The movement of the mobile part with respect to the fixed one in presence of an acceleration brings about a capacitance variation detectable by an associated control circuit.

In particular, when the mobile part is formed by a suspended moving element, in case of an acceleration acting on the device, the suspended moving element moves with respect to the fixed part according to the translation, or rotation, degrees of freedom allowed to the suspended moving element according to the specific suspension type. The degrees of freedom correspond to the preferential axes of detection of the sensor in so far as the displacement of the moving element is maximum when the acceleration has a direction parallel to one of these axes and is considerably smaller otherwise.

Currently, inertial sensors perform detection of the movement in one or at the most two preferential directions of detection, for example ones parallel to the plane of the suspended moving element. When it is desired to detect the movement with a number of preferential directions of detection it is therefore necessary to replicate the sensor an appropriate number of times within the same device, with obvious problems of increase in dimensions and circuit complexity.

In the specific case of inertial switches, their operation envisages generation of a movement detection pulse as soon as the acceleration component in one of the preferential detection directions exceeds a certain threshold. Usually, an appropriate value is attributed to this threshold so as to prevent false detection due to disturbance of various nature; in general the detection threshold is the same for all the directions of movement.

The drawback of these inertial devices is due to the fact that, in case of movements in a plane direction different from the preferential detection axes, the acceleration necessary for exceeding the threshold is higher than in case of movements made in the preferential detection directions. Consequently, an acceleration, albeit having an intensity higher than the preset threshold, cannot be detected if its direction departs significantly from the preferential detection axes and its components along the preferential detection axes are smaller than the preset threshold.

In order to overcome this problem, commonly known as threshold error, it is possible to lower the detection threshold; this solution is not, however, satisfactory in so far as it causes the detection of disturbance even of modest intensity.

In U.S. patent application Ser. No. 10/788,962, filed on Feb. 27, 2004 in the name of the present applicant, the use is proposed of an inertial device comprising two movement sensors, each having a respective preferential detection direction (orthogonal to one another), and two detection thresholds having different values. In particular, a first threshold, of higher value, relates to accelerations directed in one of the preferential detection directions, and a second threshold, of lower value, relates to accelerations directed in different directions. Basically, the device detects a movement when at least one of the two components of the acceleration signal along the detection axes is greater than the first upper threshold, or else when both the components are simultaneously greater than the second lower threshold.

In this way, the threshold errors are sensibly reduced but the reading electronics must be doubled since it must comprise twice as many threshold comparators and an additional logics for controlling the logic relations between the signals at output from the comparators.

The same technique can moreover be extended so as to reduce further the threshold error by including a larger number of preferential detection directions and hence of threshold comparators and additional thresholds, with the obvious disadvantage, however, of increasing further the complexity of the reading electronics.

BRIEF SUMMARY OF THE INVENTION

Embodiments of the present invention relate to a planar inertial sensor.

In particular, a planar inertial sensor is described which reduces sensibly the problem of the threshold error in so far as the moving element is able to move in any direction of the plane and is thus able to generate a capacitive variation following upon accelerations in any direction of its own plane. In a preferred embodiment, the capacitive variation can advantageously take place isotropically, i.e., it is independent of the direction of the detected acceleration.

According to an embodiment of the invention, an inertial sensor is provided, including a first, fixed region of semiconductor material, and a second region of semiconductor material, the second region being mobile and facing, at least in part, the first region. The second region extends in a plane, and is translatable with respect to the first region in any direction belonging to the plane.

The first and second regions are capacitively coupled to one another and have first and, respectively, second portions facing one another. The second portions are mobile with respect to the first portions so as to modify the distance between them in case of translation of the second region with respect to the first region.

A capacitive value of the capacitive coupling between the first and second regions varies in accordance with a distance of translation of the second region with respect to first region. The variation is independent of the direction of translation of the second region.

According to an embodiment of the invention the inertial sensor is part of an electronic device, a cell phone, hand-held video game, etc.

According to another embodiment of the invention, a method of operation is provided.

BRIEF DESCRIPTION OF THE SEVERAL VIEWS OF THE DRAWINGS

For a better understanding of the present invention, some preferred embodiments thereof are now described, purely by way of non-limiting example, with reference to the attached drawings, wherein.

DETAILED DESCRIPTION OF THE INVENTION

The present sensor, according to various embodiments of the invention, may be advantageously used as an inertial switch, for example for re-activating, from stand-by, portable electronic apparatus, such as palm-top computers, cellphones, pocket video-games or calculators. These devices in fact are able to switch off, or set in stand-by, some of their components or some of their functions when they are not used, so as to reduce the consumption of electric power. Thus, the problem exists of re-activating the full functionality as soon as the device exits the resting condition. To this end, acceleration is detected, and an exit-from-stand-by command is issued when this acceleration is higher than a given threshold.

Figure 1:
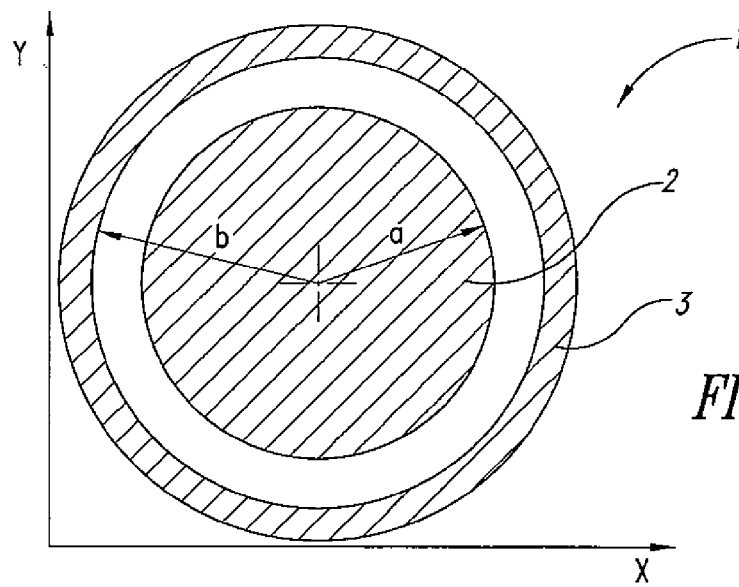
FIG. 1 shows a schematic plan view of the inertial sensor according to a first embodiment of the invention, in the resting condition.

FIG. 1 illustrates schematically a first embodiment of an inertial sensor 1 according to the present invention. The inertial sensor 1 comprises a mobile central moving element (referred to hereinafter as rotor 2) and a fixed element (referred to hereinafter as stator 3), which surrounds the rotor 2. In a way not shown, the rotor 2 is suspended above a substrate of semiconductor material and is anchored thereto so as to be able to translate, with respect to the stator 3, in any direction of the plane of the rotor 2. Preferably, the rotor 2 is supported by a central anchor formed by a pin projecting from the substrate. Alternatively, the rotor 2 can be connected to the fixed structure (but electrically isolated from the stator 3) through springs (not shown), which are coplanar to the rotor 2 and to the stator 3 and enable movement thereof in the plane.

The rotor 2 and the stator 3 form the two plates of a capacitor, the capacitance whereof depends upon the distance between them and is thus variable according to the displacement of the rotor 2 with respect to the stator 3.

In the embodiment illustrated in FIG. 1, the inertial sensor 1 has characteristics of perfect isotropy in so far as the rotor 2 is a circular moving element and the stator 3 is an annulus that surrounds the rotor 2. In FIG. 1 designated by a and b are, respectively, the radius of the rotor 2 and the internal radius of the stator 3.

In the resting condition, i.e., in absence of accelerations acting on the inertial sensor 1, the rotor 2 and the stator 3 are perfectly concentric.

Figure 2:
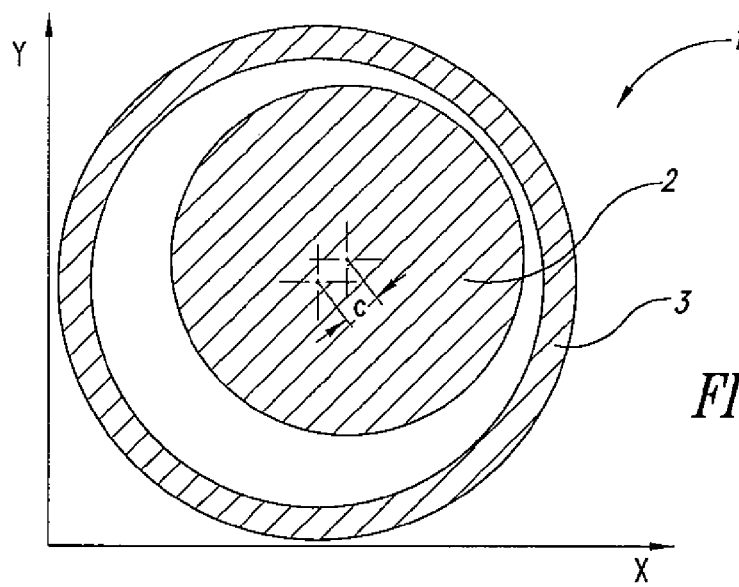
FIG. 2 is a view similar to the previous one after displacement from the resting condition.

In presence of an acceleration, the rotor 2 moves with respect to the stator 3, setting itself in a configuration of the type represented in FIG. 2, where c indicates the distance between the centres of the rotor 2 and of the stator 3.

It should be emphasized that, thanks to the structure of the inertial sensor 1, the rotor 2 is displaced from the resting position in presence of any acceleration having a direction lying in the plane of the rotor 2.

Preferably, detection of the displacement is obtained in the so-called single-sided mode in so far as the capacitive variation due to the movement between a mobile part (the rotor 2) and a fixed part (the stator 3) is simply measured.

In detail, the capacitance of a capacitor formed by two parallel circular cylindrical electrodes, having a distance c between their centres, is given by:

$$C = 2\pi\varepsilon_0 l \left[ \text{arcosh}\left( -\frac{c^2 - a^2 - b^2}{2ab} \right) \right]^{-1}$$

where l indicates the thickness of the plates (i.e., the thickness of the rotor 2 and the stator 3); and $\epsilon_0$ is the dielectric constant of empty space.

As is evident from the formula, the capacitance depends, apart from upon the geometrical dimensions of the rotor 2 and of the stator 3, just upon their relative position.

Figure 3:
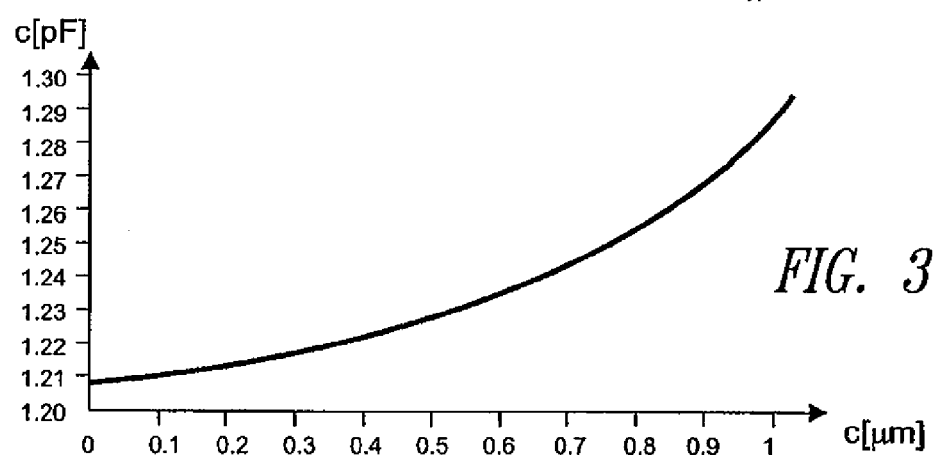
FIG. 3 shows a plot of the capacitive variation generated by the sensor of FIG. 1, in response to a displacement from the resting condition.

The dependence of the capacitance C upon the variation of the distance c between the centres of the rotor 2 and the stator 3, and hence of their relative displacement, is illustrated in FIG. 3. As may be seen from the plot, this trend is hyperbolic, the capacitive variation with respect to the rest situation increasing as the separation c between the centres increases.

A control electronics (not illustrated) is hence able to evaluate the displacement of the rotor 2 with respect to the stator 3 according to the variation in the resulting capacitance.

It is evident that an inertial sensor of the type described has no preferential detection directions in so far as the capacitive variation is a direct function of the displacement in any planar direction and not of the individual components in preset reference directions.

Furthermore, in addition to being perfectly omnidirectional, this sensor is also perfectly isotropic since displacements of identical amplitude in any direction cause an identical capacitive variation.

Figure 4:
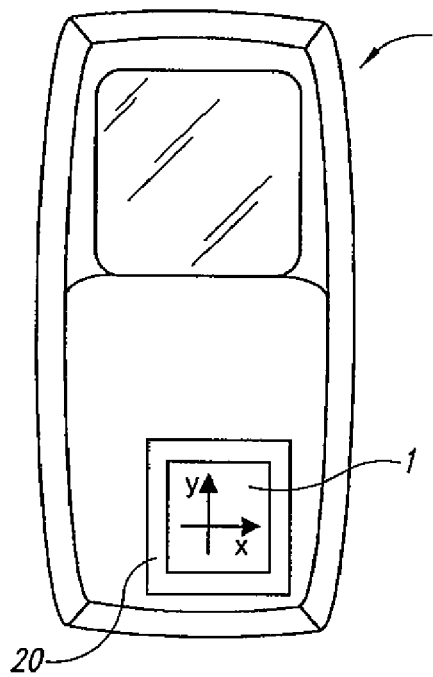
FIG. 4 is a top plan view of a portable electronic apparatus incorporating the sensor of FIG. 1.

These characteristics are particularly advantageous when the described inertial sensor is used for re-activating from stand-by portable electronic devices, as illustrated in FIG. 4, where the inertial sensor 1 is incorporated within a portable device 10, in this case a cellphone, which also comprises a circuit for re-activation from stand-by 20. Also represented in the figure are the axes X and Y defining the plane of the rotor 2.

Figure 5:
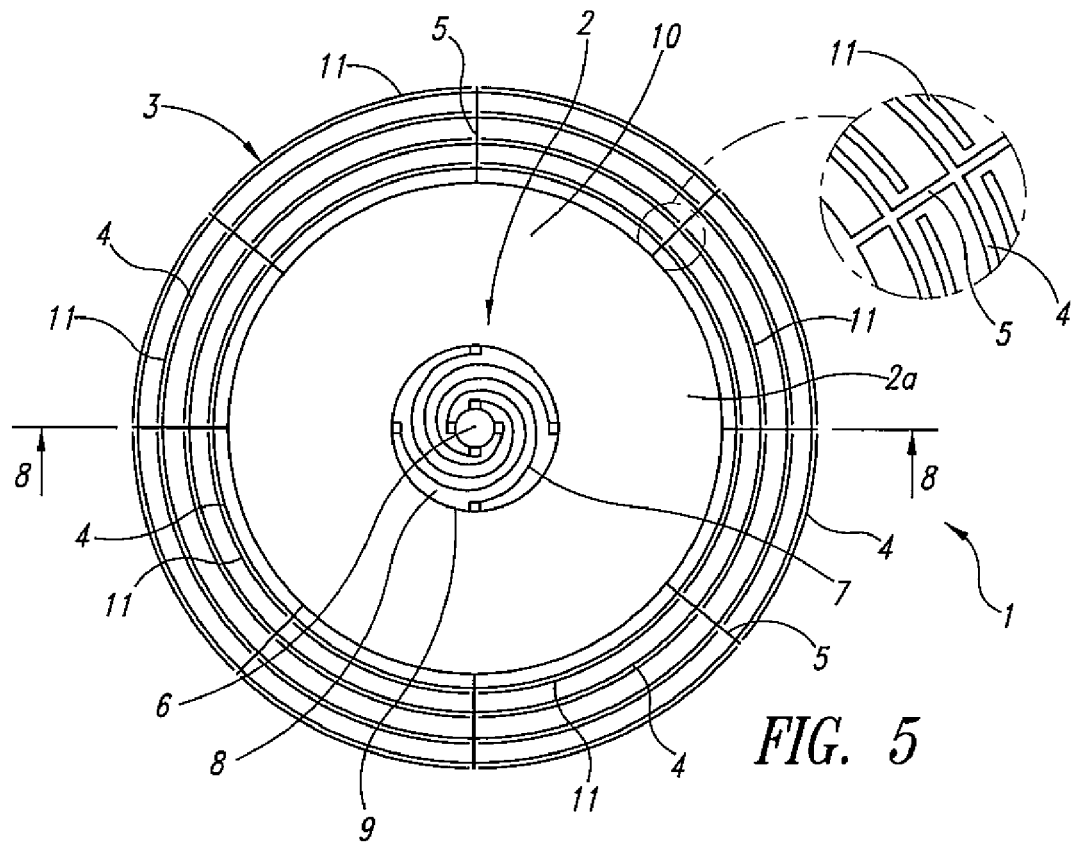
FIG. 5 is a top plan view, in greater detail, of the sensor of FIG. 1.

FIG. 5 shows, instead, a more detailed view of the inertial sensor 1 of FIG. 1, according to an embodiment of the invention.

As may be noted, the rotor 2 is formed by a central body 2a and by a plurality of rings 4, which are concentric to one another and to the central body 2a. The rings 4 (forming mobile electrodes) are fixed to the central body 2a through rigid arms 5, which extend radially towards the outside of the central body 2a.

The central body 2a is connected to a substrate 12 (see FIG. 8) through a central anchoring pin 6. In detail, the central body 2a has a central hole 8 delimiting an internal circumference 9 of the central body 2a; the central anchoring pin 6 extends within the central hole 8 and is connected to the internal circumference 9 of the central body 2a by isotropic spiral springs 7.

The isotropic spiral springs 7 have a very small width (for example 3-4 μm) so as to enable displacement of the rotor 2 in any planar direction.

Preferably, the rotor 2, the central anchoring pin 6, and the isotropic spiral springs 7 are formed in a single layer of semiconductor material (for example, an epitaxial layer). Moreover, the central body 2a of the rotor 2 has a plurality of through holes 10, necessary for removing, by chemical etching, a sacrificial oxide layer underlying the epitaxial layer, in a per se known manner.

The stator 3 is formed by a plurality of arched portions 11 forming fixed electrodes. In detail, the arched portions 11 form circumference arcs facing the rings 4 and each of them is arranged between an adjacent pair of rigid arms 5. In the embodiment shown, the arched portions 11 are arranged on the outside of the rings 4. The arched portions 11 are moreover connected in parallel to one another, for example by anchoring regions extending beneath the plane of the rotor 2 and electrically connected to one another or to a common node, in a not shown manner.

By appropriately biasing the rotor 2 and the stator 3, the displacement of the rotor 2 with respect to the stator 3 is detected as a result of the capacitive variation due to the displacement of the rings 4 with respect to the arched portions 11.

Thanks to the presence of a large number of electrodes (rings 4 and arched portions 11) and to the consequent increase in the facing area between the stator 3 and the rotor 2, the embodiment of FIG. 5 supplies a capacitive variation signal higher than that of the simplified structure of FIGS. 1 and 2.

Figure 6:
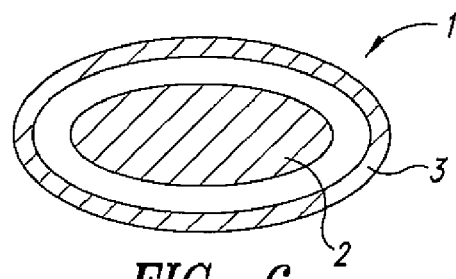
FIG. 6 shows a schematic plan view of a second embodiment of the sensor of FIG. 1.

FIG. 6 shows an embodiment of the present sensor, wherein both the rotor 2 and the stator 3 have an elliptical shape.

Figure 7:
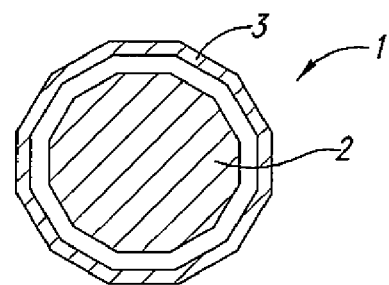
FIG. 7 shows a schematic plan view of a third embodiment of the sensor of FIG. 1.

FIG. 7 shows an embodiment of the present sensor, wherein both the rotor 2 that the stator 3 have a dodecagonal shape.

Figure 8:
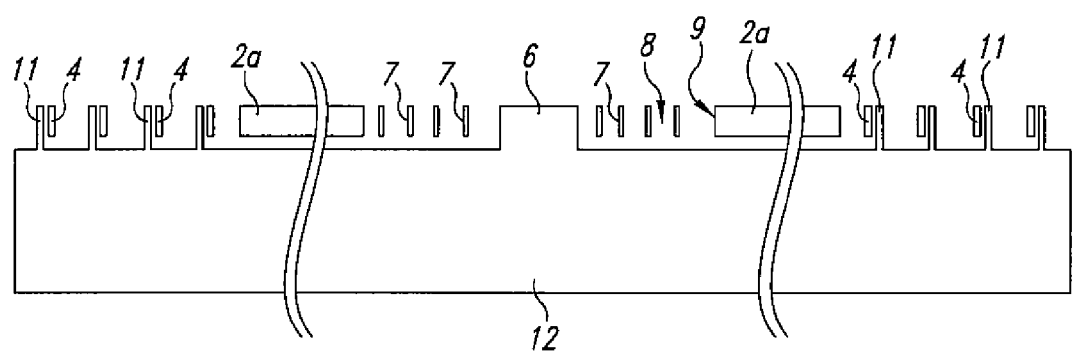
FIG. 8 shows a cross-sectional view of the sensor of FIG. 5 taken along lines 5-5.

FIG. 8 shows a cross-sectional view of the sensor of FIG. 5 taken along lines 5-5. The pin 6 is shown projecting from the substrate 12, while the rotor 2 is suspended above the substrate by springs 7. The arched portions 11 of the fixed electrodes are shown facing the mobile electrodes of the rotor formed by the rings 4.

A sensor having a radially symmetrical shape, such as that described with reference to FIGS. 1, 2, 5, and 7, can be configured to detect movement in any direction in the plane in a uniform way, at least to a first approximation. For example one having ordinary skill in the art will recognize that the sensitivity of the dodecagonal sensor of FIG. 7 will be closer to perfectly isotropic than an octagonal sensor, or a hexagonal sensor. Thus, as a general rule, the greater the number of sides, or the closer to a perfectly circular shape given to the sensor, the closer to a perfectly isotropic sensor will result. The present inertial sensor, thanks to the use of MEMS technology, has, with respect to similar known sensors, the advantage of having extremely small overall dimensions, very low fabrication costs, with the possibility of large-scale production, practically negligible levels of electric power consumption, and very high sensitivity, and can moreover be integrated with other electronics, for example for the threshold-detection circuit.

In addition, the described sensor enables direct detection of displacements in any direction of the plane of the sensor, instead of detection of the projections of these displacements on given reference axes.

Consequently, just one sensor is sufficient for the detection of displacements in the plane, and it is thus possible to reduce considerably the area occupied on the silicon, the production costs and the current consumption with respect to solutions that require replication of a same unidirectional (or bidirectional) inertial sensor within the same device.

The inertial sensor described has, according to its preferred embodiment, a circular rotor and circular stator and is perfectly isotropic in so far as displacements in any direction cause a same capacitive variation and hence the same effect on the movement detection.

Furthermore, the threshold error is substantially cancelled, and it is possible to simplify further the electronics of the threshold-detection circuit.

Finally, it is evident that modifications and variations can be made to the inertial sensor described and illustrated herein, without thereby departing from the scope of the present invention, as defined in the annexed claims.

In particular, it is clear that the mutual disposition of the rotor and of the stator could be different from what is illustrated in FIG. 5 in so far as the stator could be formed by arcs inside the circular electrodes of the rotor.

In addition, the sensor can present forms different from the ones described herein.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An inertial sensor, comprising:
a first region of semiconductor material formed by a first plurality of arc-shaped regions arranged on concentric circumferences, said first region being fixed; and
a second region of semiconductor material formed by a second plurality of arc-shaped regions arranged on concentric circumferences, each of said arc-shaped regions of said first plurality facing, on a first side thereof, a respective arc-shaped region of said second plurality, and positioned such that a distance between each of said arc-shaped regions of said first plurality and the respective arc-shaped region of said second plurality is substantially less than a distance between each of said arc-shaped regions of said first plurality and any of the arc-shaped regions of said second plurality positioned on a second side of the respective one of said first plurality of arc-shaped regions, said second region being mobile and extending in a plane, and said second region being translatable with respect to said first region in any direction belonging to said plane.

2. The inertial sensor according to claim 1 wherein said first and second regions are capacitively coupled to one another.

3. The inertial sensor according to claim 2 wherein said first and second regions have a basically circular shape and said first and second portions are shaped like the arc of a circumference.

4. The inertial sensor according to claim 2 wherein a capacitive value of the capacitive coupling between the first and second regions varies in accordance with a distance of translation of the second region with respect to first region, and wherein the variation is substantially independent of a direction of translation belonging to said plane.

5. The inertial sensor according to claim 1 wherein said arc-shaped regions of said second region arranged on a same circumference are connected together to form a plurality of concentric rings connected to one another through radial-connection arms.

6. The inertial sensor according to claim 1 wherein said second region is supported by a central anchorage.

7. The inertial sensor according to claim 6 wherein said second region has a central opening and said central anchorage comprises a pin element extending in said central opening and a plurality of spiral springs extending between said pin element and said second region.

8. The inertial sensor according to claim 1 wherein said first and second regions have a substantially elliptical shape.

9. The inertial sensor according to claim 1 wherein said first and second regions have a substantially polygonal shape.

10. A portable electronic apparatus comprising:
a device for re-activation from stand-by, said device for re-activation from stand-by including an inertial sensor having a first region of semiconductor material, said first region having a first plurality of electrodes, and a second region of semiconductor material, said second region being mobile with respect to said first region and having a second plurality of electrodes formed by a plurality of concentric rings, each of the second plurality of electrodes facing, at least in part, a respective one of said first plurality of electrodes, said second region extending in a plane, and said second region being translatable with respect to said first region in any direction belonging to said plane.

11. The electronic apparatus of claim 10 wherein the portable electronic apparatus is one of a palm-top computer, a cellphone, a pocket video-game, or a calculator.

12. The electronic apparatus of claim 11 wherein the first plurality of electrodes of the first region of semiconductor material is fixed with respect to the device.

13. A device, comprising:
a support substrate;
a stator region formed on the substrate and including a sensor region having a plurality of sensor electrodes electrically coupled to a common node; and
a rotor, including a plurality of rotor electrodes mechanically coupled to the rotor, movably coup led to the substrate such that the rotor is free to move in any direction lying in a plane parallel to a surface of the substrate, the rotor being capacitively coupled to the stator region such that translation of the rotor a given distance in any direction lying in the plane changes the capacitive coupling to a degree substantially equal to a change of the coupling resulting from displacement of the rotor the same distance in any other direction lying in the plane.

14. The device of claim 13 wherein the support substrate is a first semiconductor material layer, and wherein the stator region and rotor region are formed in a second semiconductor material layer formed on the first semiconductor material layer.

15. The device of claim 13, comprising:
a detection circuit including a capacitor formed by the capacitive coupling and configured to detect changes of the capacitive coupling that exceed a selected threshold.

16. The device of claim 15 wherein the detection circuit is configured to bring a system from standby to active when the selected threshold is exceeded.

17. The device of claim 13 wherein:
the rotor is radially symmetrical, in plan view.

18. The device of claim 17 wherein the rotor has a polygonal shape.

19. The device of claim 17 wherein the rotor has a substantially circular shape.

20. The device of claim 13 wherein:
the rotor has a substantially annular shape; and
wherein the rotor is movably coupled to the substrate via a plurality of springs surrounded by the annular shaped rotor and mechanically coupled at respective first ends to the rotor and at respective second ends to the substrate.

21. The device of claim 13 wherein:
the plurality of rotor electrodes is formed by a plurality of concentric rings mechanically coupled to the roto; and
each of the plurality of sensor electrodes faces a respective one of the plurality of rotor electrodes.

22. The device of claim 13 wherein the device comprises a cellular telephone.

23. The device of claim 13 wherein the device comprises a hand-held video game.

24. The device of claim 13 wherein the device comprises a palm-top computer.

25. The device of claim 13 wherein the device comprises a calculator.

26. The device of claim 13 wherein each of the plurality of sensor electrodes and each of the plurality of rotor electrodes is arc-shaped.

27. The device of claim 13 wherein each of the concentric rings of rotor electrodes is coupled to the rotor by radial connection arms.

28. A method, comprising:
displacing a rotor having a plurality of concentric rings mechanically coupled to the rotor, within a plane, a distance relative to a stator having a plurality of sensor electrodes arranged such that each sensor electrode faces a respective portion of one of the plurality of concentric rings; and
varying a capacitive coupling between the rotor and the stator in direct relation to the distance the rotor is displaced, a magnitude of the variation being substantially independent of a direction of displacement of the rotor within the plane.

29. The method of claim 28 wherein the relationship between the distance of displacement and magnitude of variation is non-linear.

30. The method of claim 28, comprising performing the displacing step in response to movement of an electronic device.

31. The method of claim 28 wherein the plurality of concentric rings are mechanically coupled to the rotor by rigid arms extending radially from the rotor.

* * * * *